United States Patent [19]

Reed et al.

[11] Patent Number: 4,823,226

[45] Date of Patent: Apr. 18, 1989

[54] PHASE LOSS DETECTION CIRCUIT INCLUDING TRANSIENT PROTECTION

[75] Inventors: Ryan T. Reed, Waterford; Earl J. Curran, Jr., South Milwaukee, both of Wis.

[73] Assignee: Square D Company, Palatine, Ill.

[21] Appl. No.: 98,101

[22] Filed: Sep. 17, 1987

[51] Int. Cl.$^4$ .............................................. H02H 3/00
[52] U.S. Cl. ........................................ 361/85; 361/88; 361/91
[58] Field of Search ........................ 361/85, 86, 87, 88, 361/92, 91

[56] References Cited

U.S. PATENT DOCUMENTS 4,420,788  12/1983  Wilkinson et al. .................... 361/85
4,686,601  8/1987  Alexander et al. ............... 361/85 X Primary Examiner—Gerald P. Tolin
Assistant Examiner—Derek S. Jennings
Attorney, Agent, or Firm—Richard T. Guttman; A. Sidney Johnston

[57] ABSTRACT

A phase loss detection circuit for a three phase electrical system providing three phase power as to a motor, the three phase electrical being subject to a phase loss condition and a transient condition is disclosed. The transient condition includes starting transients, stopping transients or severe load transients. The phase loss detection circuit distinguishes between a phase loss condition and a transient condition and indicates when a loss of phase has occurred. The phase loss detection circuit comprises a detector for detecting an instantaneous voltage of the electrical system, a sensor for generating an instantaneous voltage signal representing the instantaneous detected voltage, a detector for detecting a peak detected voltage of the electrical system, a generator for generating a peak detected voltage signal representing said peak detected voltage, a comparator for comparing the peak detected voltage with the instantaneous voltage and generating a compared signal, the compared signal comprising a first polarity during steady state operation, a second, opposite polarity during the transient condition and an alternating polarity during the phase loss condition, and a detector for detecting the alternating polarity, thereby indicating the phase loss condition.

7 Claims, 4 Drawing Sheets

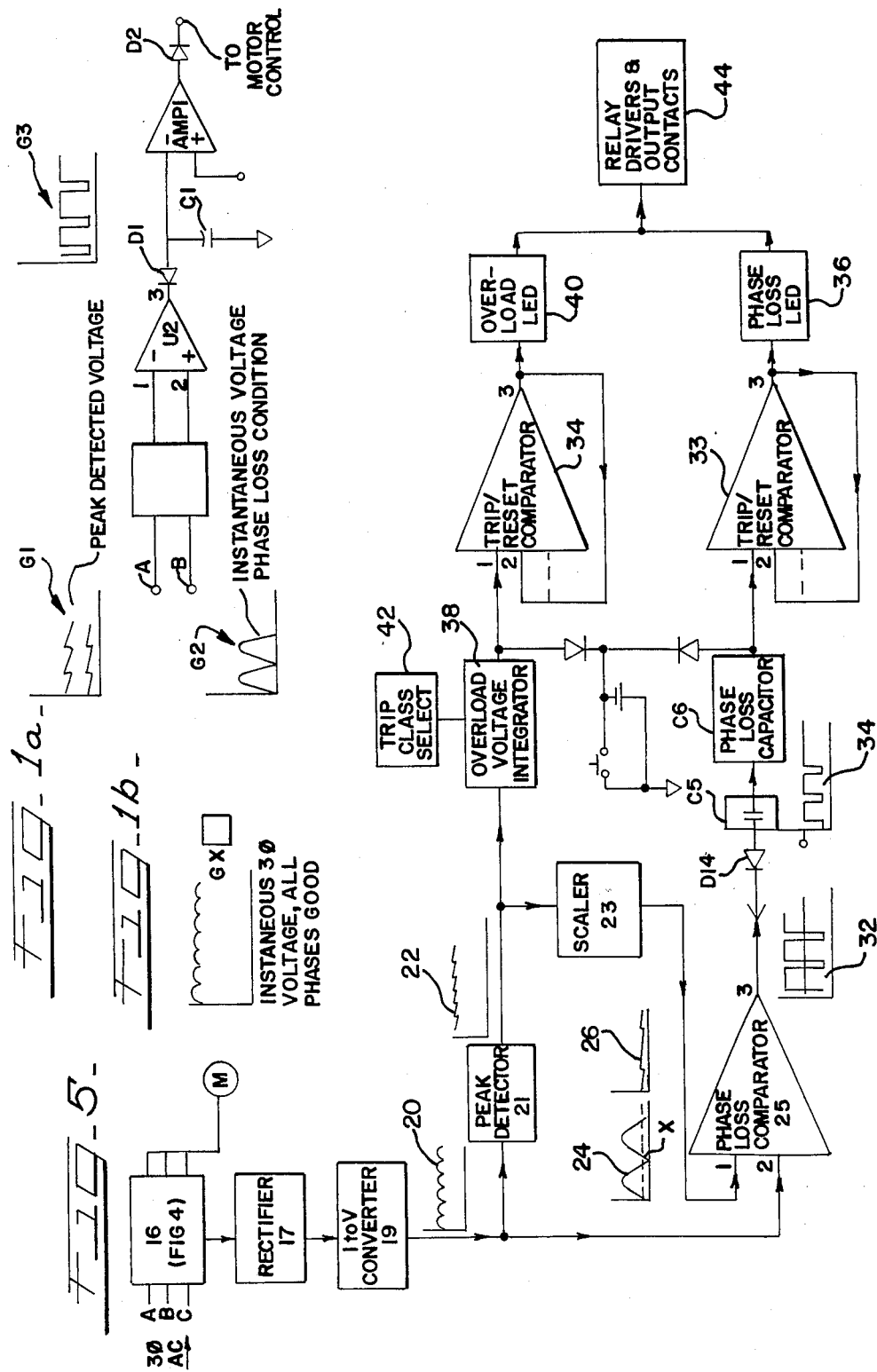

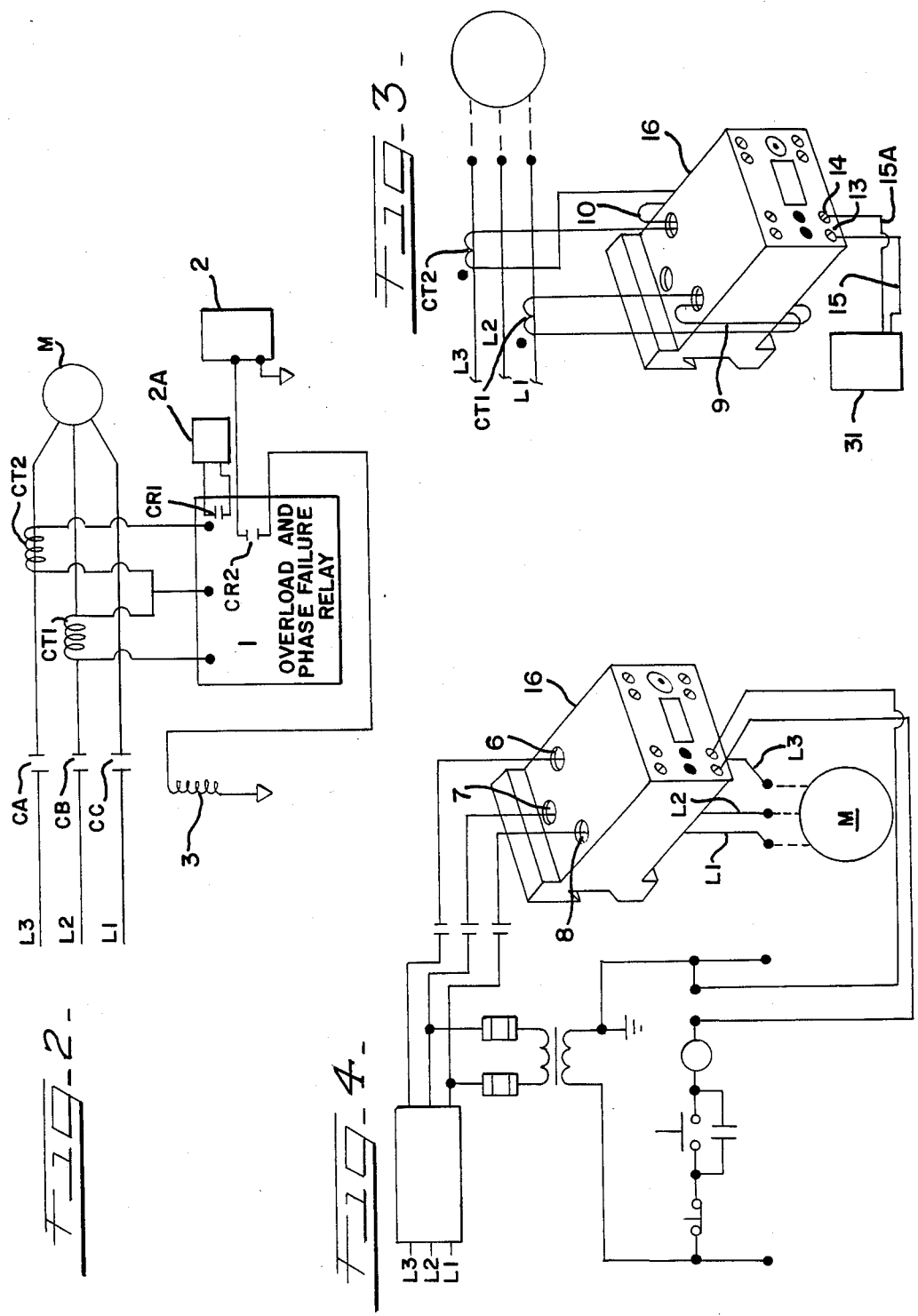

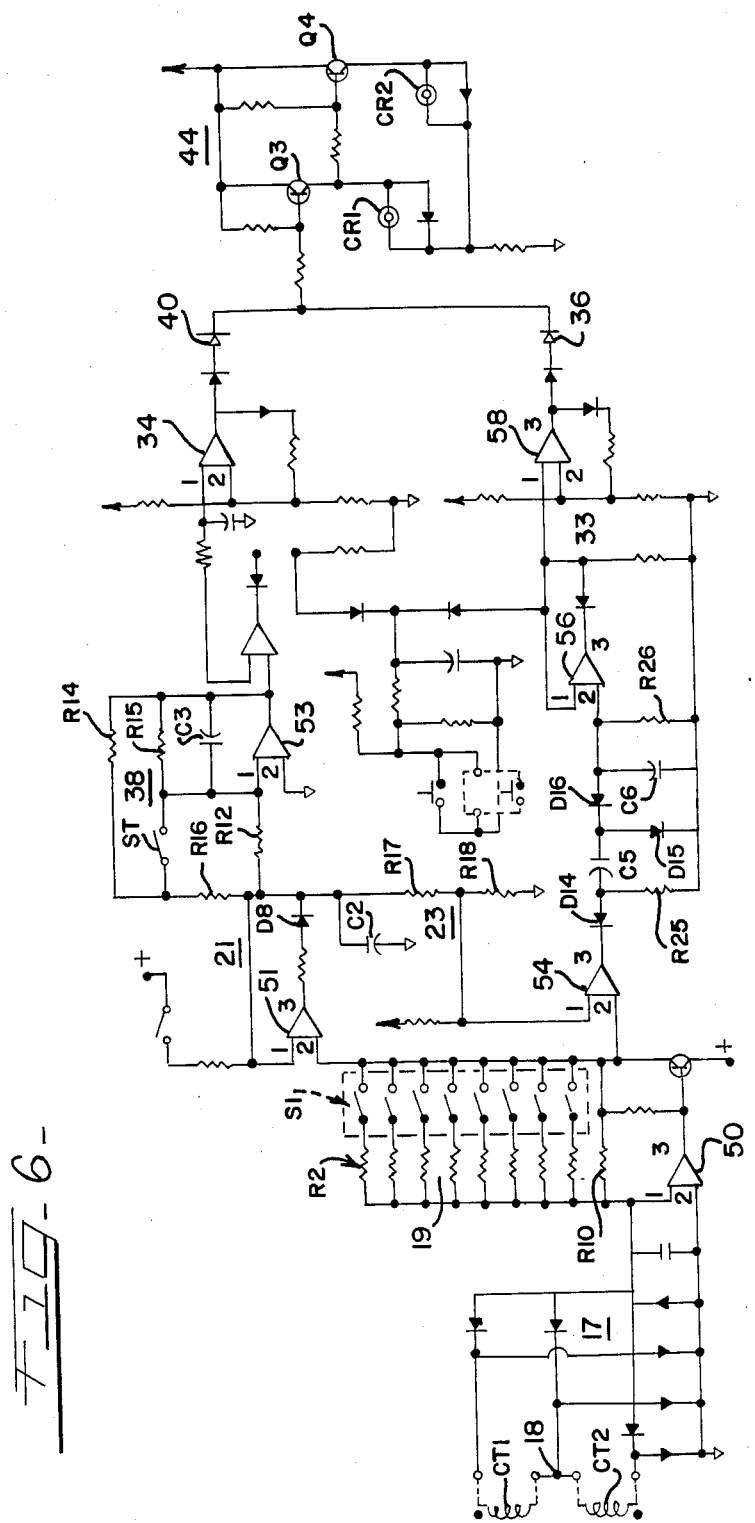
FIG-6-

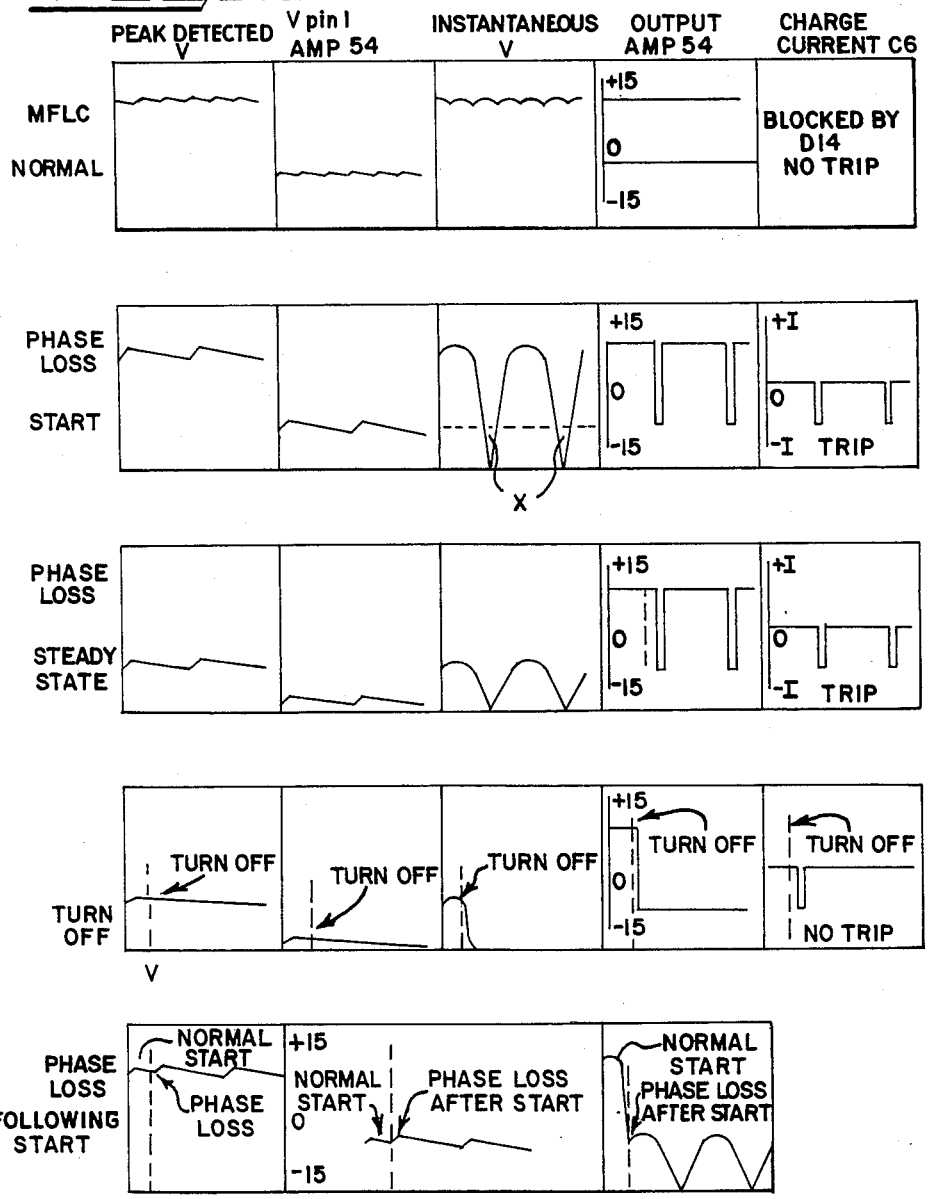
FIG. 7
MFLC = MOTOR FULL LOAD CURRENT
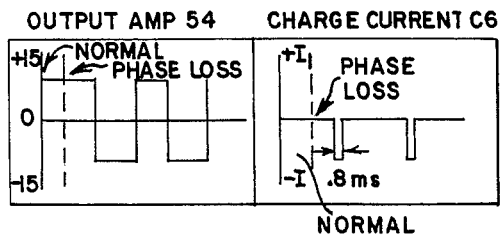

PHASE LOSS DETECTION CIRCUIT INCLUDING TRANSIENT PROTECTION

TECHNICAL FIELD

The present invention relates generally to phase loss indication and protection circuits, which circuits are intended to give an indication and provide a tripping control to a motor driven by a three-phase alternating current system when there is a loss of current in one line of the three-phase system.

BACKGROUND OF THE INVENTION

Refer initially to FIG. 1 which shows a phase loss circuit which is known prior art and such as is used by the assignee of the present invention.

The phase loss circuit of FIG. 1 includes two inputs. One input at terminal B is a summed, three-phase, half-wave rectified voltage proportional to the phase current provided to the motor, or as referred to herein, the instantaneous voltage. In the normal case, the instantaneous voltage is repeating half wave 2.76 milliseconds in duration riding on a DC level as indicated by the graph GX. During a phase loss condition, the instantaneous voltage becomes a repeating half wave but 8.3 milliseconds in duration and dipping all the way to zero level, as indicated in graph G2.

The second input to the phase loss circuit is a peak detected voltage at terminal A which is a smaller proportion of the motor phase current. The peak detected voltage is a fixed proportion of the instantaneous voltage; however, during rapidly changing transients the peak detected voltage reacts or changes more slowly than the instantaneous voltage.

The peak detected voltage and instantaneous voltage are coupled to input terminal pins 1 and 2 respectively of a comparator U2. In the normal case, the instantaneous voltage at pin 2 is riding on some DC level, and the peak detected voltage at pin 1 is something less than the instantaneous voltage. The output at terminal pin 3 of comparator U2 is positive voltage which is blocked by a relatively reversely connected diode D1. During a phase loss condition, the instantaneous voltage will dip to zero; the peak detected voltage will still be a fixed proportion of the instantaneous voltage; and, the output of comparator U2 will pulse negative by each half cycle, as indicated in graph G3, for a length of time as determined by the following equation:

$$Tp = \operatorname{Sin}^{-1}(Vr/Vp) \times 2K$$

Where:
Tp = Time of the pulse width for two adjacent half-waves
Vr = Scaled peak detected DC reference
Vp = Peak value of the instantaneous sine wave
K = Conversion factor for changing degrees to microseconds (46.3 usec/degree)

The output pulses from comparator U2 then charge a phase loss capacitor C1 to a tripping level. Thus, a signal from capacitor C1 is coupled through amplifier AMP 1 and diode D2 to motor tripping control.

The method of phase loss sensing is predictable and is used in the prior art. However, the circuit just described will give false indications during starting transients, stopping, and severe load transitions. If the turn-off condition is examined, it is found that the instantaneous voltage will dip to zero and stay there. The peak detected signal will fall to zero some half second after the instantaneous voltage, thereby causing the comparator to switch to its negative output and enabling capacitor C1 to charge to its trip level. This can result in an unwanted or nuisance trip.

Severe load transients can also cause false indication for a short time. The prior art deals with this condition by raising the phase loss trip level so that the amount or level to which the capacitor gets charged during the transition will not trip the circuit. Raising the trip level extends the trip time during a true phase loss condition.

SUMMARY OF THE INVENTION

The invention relates to a phase loss and phase failure relay detection and control circuit for a three-phase electrical system for providing instantaneous detection of the loss of a phase and providing protection after a predetermined time interval to three-phase motors connected to the circuit. The circuit detects the loss of a phase by sensing and rectifying the instantaneous voltage and comparing the instantaneous voltage with a scaled proportional voltage.

The circuit detects a phase loss by monitoring when the instantaneous voltage goes to zero. The circuit includes a charging capacitor. Importantly the circuit includes a blocking subcircuit coupled between said passing pulsed direct current (DC) to charge said capacitor during a phase loss condition to cause said capacitor to cause triggering of a trip signal controller.

The inventive circuit actuates the trip signal only in response to a phase loss condition and discriminates against starting transients, motor stopping and severe load transients.

The foregoing features and advantages of the present invention will be apparent from the following more particular description of the invention. The accompanying drawings, listed hereinbelow, are useful in explaining the invention wherein.

BRIEF DESCRIPTION OF THE DRAWINGS

FIGS. 1a and 1b are block diagram circuits and graphs useful in discussing the prior art, as above;

FIG. 2 is a diagram showing the connections of a three-phase system to a motor and the inventive overload and phase failure relay;

FIG. 3 shows a housing including the inventive relay and the transformer connections thereto;

FIG. 4 shows an alternative transformer connection of the housing of FIG. 3;

FIG. 5 is a block diagram of the inventive circuitry;

FIG. 6 is an electrical diagram of the inventive circuitry; and

FIG. 7 shows wave forms useful in explaining the invention.

DESCRIPTION OF THE INVENTION

The present invention comprises an overload relay with a phase failure protection circuit. The invention provides overload protection and phase failure protection such as to a motor connected thereto.

FIG. 2 shows current transformers CT1 and CT2 which pick up current flow in lines L2 and L3 of a three-phase current circuit connecting to a load such as an electric motor M. The output of transformers CT1 and CT2 is coupled to an overload and phase failure relay assembly 1, to be explained in detail hereinafter. Relay assembly 1 has a set of contacts CR2 connecting from a contactor power supply and ON-OFF switch 2 in series to a contactor coil 3 and ground reference. Contactor coil 3 controls contacts CA, CB and CC connected in series to lines L1, L2 and L3, respectively. A second set of contacts CR1 connect to an alarm circuit 2A. In an alternative embodiment, one relay can be used and the one relay can have a number of separate contacts.

FIG. 3 shows the secondary windings 9 and 10, received in housing 16, and the primary windings of transformers CT1 and CT2 inductively connecting to power lines L1 and L3. Windings 9 and 10 each have two turns which pass through two of the three holes 6, 7 and 8 extending through housing 16. Terminals 13 and 14 on housing 16 connect through leads 15 and 15A to control circuits 31 to be explained.

The housing 16 and circuitry as shown in FIG. 3 is used for applications wherein current flow to the motor M load exceeds forty-six (46) amperes in one embodiment and thirty-two (32) amperes in a second embodiment. FIG. 4 shows the housing 16 as it would be connected for those applications wherein the current flow to the load is from zero to forty-six (0-46) amperes.

In FIG. 4, the power lines L1, L2 and L3 are connected to pass through holes 6, 7 and 8 of housing 16 and thence connect to the motor M.

In FIG. 4, wires L1 and L3 couple internally to current transformers CT1 and CT2. This coupling in turn induces a current in the current transformer secondaries in a ratio 6000:1 in one embodiment and 2500:1 in a second embodiment. In another alternative embodiment, a 3000:1 ratio has been found useful. Wire L1 passes through transformer CT1. Wire L2 passes through transformer CT2. The undotted terminals of CT1 and CT2 are joined at a common terminal 18, see FIG. 6.

Referring now to FIG. 6, it can be shown mathematically that from this common terminal 18 an equivalent current I2 will flow. Note that if phase-1 plus phase-2 plus phase-3 equal zero; then, phase-1 plus phase-3 equal minus phase-2. In an instant in time, an induced phase-1 secondary current is flowing out of the dotted (upper) terminal of transformer CT1, and an induced phase-3 secondary current is flowing out of the dotted (lower) terminal of transformer CT2. With these phase-1 and phase-3 currents flowing out of transformer CT1 and CT2, then at the same instant in time, a minus phase-2 secondary current must be flowing out of the transformer CT1-CT2 common terminal 18. In the circuit of FIG. 6, these three phase currents are fed into a bridge rectifier 17, of suitable known type.

FIG. 5 shows a block diagram of the inventive circuitry which is intended to tie in the structure of FIG. 4 with the circuitry of FIG. 5. More specifically, FIG. 5 shows the overload and phase failure relay 1 with the current transformer current sensing housing 16, as shown in FIG. 4, connecting to the relay drivers and output contacts.

The block diagram FIG. 5 will be described first, then the detailed electrical diagram of FIG. 6 will be explained.

As stated above, bridge 17 rectifies the three-phase current from transformers CT1 and CT2, sums the currents and passes a pulsating DC current to an I (current) to V (voltage) converter 19, to be described. Converter 19 generates a DC voltage (see graph 20 showing adjacent converter 19) which is proportional to the current in motor M. When the scaling or gain of the converter 19 is set correctly to a motor full load current, its peak output will conveniently be 2 volts at full load and will be coupled to peak detector 21. Peak detector 21 includes a capacitor C2 (see FIG. 6) which charges to a voltage (see graph 22) which is scaled down by scaler 23 (see graph 26) and coupled as a reference to terminal pin 1 of a phase loss comparator 25. The voltage from converter 19 is also coupled as a second input (at terminal pin 2) to phase loss comparator 25. Under normal conditions, the input to pin 2 of comparator 25 is larger than the input to pin 1 of comparator 25; and, the output from comparator 25 at its pin 3 is blocked by reverse connected diode D14. However, under phase loss conditions, the voltage output from converter 19 will dip to zero every 8.3ms (compare graph 24) and will remain less than the reference (see graph 26) for about 0.6ms in the area indicated as X in graph 24. If the phase loss condition exists for about one second, then negative-going pulses from comparator 25 (see graph 32) will charge capacitor C6 through diode D14 and through capacitor C5, to a tripping value (see graph 34) of −6.6 volts. Alternatively, a longer or shorter trip time may be used.

Thus, the output from peak detector 21 is coupled through capacitor C5 to phase loss charging capacitor C6. The output from capacitor C6 is coupled to trip/reset comparator 33. If there is a phase loss, the voltage on pin 1 of comparator 33 goes negative. When the phase loss voltage is more negative than the reference at pin 2 of comparator, the output of comparator 33 at pin 3 goes positive, causing the phase loss LED 36 to light and the relay drivers and output contacts 44 to be activated.

The output of peak detector 21 is also coupled to an overload voltage integrator including an integrator capacitor 38. The voltage from peak detector 21 causes capacitor C3 to begin a negative-going voltage ramp to go to a trip value of −10 volts in either 10 or 20 seconds, dependent on the trip class select setting of switch ST as will be explained.

Normally, a reference voltage at pin 1 of comparator 34 is −10 volts and the overload voltage at its pin 2 is more positive than the reference voltage. If motor loading increases above 115 percent, the overload voltage on pin 1 goes more negative than −10 volts, and the output of comparator 34 goes positive, causing the overload LED 40 to light and the relay drivers and output contacts 44 to be activated.

Note also that the apparatus operates, in a three-phase power system; on the secondary side of the distribution transformer when the primary circuit loses one phase.

Refer now to circuit diagram of FIG. 6 and the graphs of FIG. 7 for a detailed explanation of the invention. The I to V converter 19, including operational amplifier 50, receives the input from transformers CT1 and CT2 rectified by bridge 17. Output pin 3 of amplifier 50 in conjunction with parallel connected resistors, generally labeled R2, and associated switches, generally labeled S1, produce a scaled, rectified three-phase voltage. The output of the I to V converter 19 is a DC voltage with a ripple component as shown in graph 20 of FIG. 5, and is also shown as Instantaneous V, MFLC Normal in FIG. 7. The output of the converter 19 is connected to peak detector 21 comprising an operational amplifier 51. The output of the amplifier 51 is a DC voltage with a small ripple as indicated in graph 22 of FIG. 5, and peaked detected voltage in FIG. 7. The output from pin 3 of amplifier 51 is coupled through diode D8 to charge capacitor C2. Capacitor C2 smooths the ripple on the voltage applied at input pin 2 of amplifier 51 from scaling converter 19. The voltage developed across capacitor C2 is the "peak detected voltage".

The voltage on capacitor C2 connects to an overload voltage integrator 38 trip circuit including resistors R16 and R12 and operational amplifier 53. The overload voltage integrator 38 includes operational amplifier 53, input resistors R12 and R16, feedback resistors R15 and R14, integrator capacitor C3 and switch ST. When a voltage from the peak detector 21 is applied to the overload input resistors, integrator capacitor C3 begins a negative going voltage ramp. Capacitor C3 will ramp up at a rate set by feedback resistors R15 and R14 to a magnitude set by the gain of input resistors R12 and R16. This gain of feedback to input is about six and was chosen so that with a motor current 115% of full load, the integrator 38 would ramp to greater than a trip value of −10 volts.

A second function of the overload integrator 38 includes a first mode wherein switch ST is open. This position puts input resistor R12 and feedback resistor R14 out of the overload path while maintaining the gain. With switch ST open, integrator 38 will ramp from zero volts to a trip value of −10 volts in, for example, 20 seconds (from a cold start to six times overload). In a second mode, with switch ST closed and resistors R12 and R14 connected in the overload path, integrator 38 will ramp from zero volts to a trip value of −10 volts, for example, in 10 seconds (from cold start to six times overload).

The voltage on capacitor C2 also couples to a voltage divider comprising series connected resistors R17 and R18. The voltage developed at the junction of resistors R17 and R18 is connected to pin 1 of operational amplifier 54. Under normal operating conditions, voltage of approximately 200 millivolts is applied to pin 1 of amplifier 54.

The wave forms in FIG. 7 labeled "phase loss start" and "phase loss steady state" to show operation of the phase loss circuit. If a phase is missing from the three-phase AC line, the output of the amplifier 50 scaling converter 19 is simply two peaks rather than six peaks. However, the voltage coupled from the junction of resistors R17 and R18 to pin 1 of amplifier 54 does not decrease by very much with the loss of a phase, because it is proportional to the peak voltage applied to capacitor C2, and the charge on capacitor C2, and the charge on capacitor changes relatively more slowly.

The substantially DC voltage applied to pin 1 of amplifier 54 is shown as the horizontal dotted line in the "phase loss start" graph. Whenever the voltage at pin 2 of amplifier 54 dips below the voltage on pin 1 of amplifier 54, as happens twice each cycle as shown in the phase loss start graph and labeled X, a "negative going" output pulse is generated at pin 3 of amplifier 54 (see phase loss start and steady state graph), and these pulses are coupled to the phase loss circuit including capacitor C6.

The phase loss circuit comprises essentially a charging capacitor and a filter circuit; and more specifically a diode D14, resistor R25, pulse width adjustment capacitor C5, diode D15, diode D16, capacitor C6, and resistor R26. The phase loss circuit passes pulsed DC from output pin 3 of amplifier 54 to capacitor C6. Capacitor C6 will charge up to a voltage as determined by the number of charge pulses. A voltage follower comprising amplifier 56 passes the voltage on capacitor C6 to input pin 1 of trip reset comparator 33. Importantly, capacitor C5 is connected in the series flow path from amplifier 54 to thereby block direct current (DC) flow. If pin 3 of amplifier 54 goes negative and stays there as a DC transition, then one pulse passes (i.e. the voltage transition is coupled) through capacitor C5, but that is the only pulse that is coupled through.

As stated above, during a phase loss condition a pulsed output occurs, with a frequency of two negative going pulses per AC cycle. These pulses occurring at pin 3 of amplifier 54 (see graphs showing charge current phase loss start and steady state in FIG. 7) are coupled through series connected capacitor C5 to charge parallel connected capacitor C6. When the voltage of capacitor C6 reaches a predetermined level, the trip/reset comparator 33 is activated to turn the motor off, as will be described.

The voltage at capacitor C6 is coupled by a voltage follower circuit including operational amplifier 56. Thus, the voltage at capacitor C6 appears at output pin 3 of amplifier 56. When the voltage at pin 3 of amplifier 56 passes a selected value, as set by the trip set comparator 33 comprising operational amplifier 58, then the voltage at output pin 3 of amplifier 58 makes a single transition. The transition is amplified by transistors Q3 and Q4 of the relay driver subsystem 44 and operates relays, for example, CR1. Relays Cr1 and Cr2 sound an alarm and turn the motor M off. Concurrently, LED 36 is turned ON.

Capacitor C6 comprises a low pass filter for the output pulses from output pin 3 of operational amplifier 54. Capacitor C5 comprises a high pass filter for the output pulses, and thereby forms a band pass filter with C6.

The phase loss circuit provides suppression of transients and so protects against the generation of false phase loss signals. For example, during a motor starting condition, current flow to the motor will be heavy, increasing to approximately locked motor current, or eight times rated current.

On start up a very heavy current flow surges to the motor, on the order of 8×full load current of the motor. This transient produces large currents at the output of current transformers CT1, CT2 shown in FIG. 6. The output currents from CT1, CT2 pass through the current to voltage converter 50. At the output of the current to voltage converter 50 the circuit takes two paths. One path is through peak detector 51 and the other path is through comparator 54. Now the branch that goes through peak detector 51 is scaled through the voltage divider provided by resistor R17, R18. Also, the capacitor C2 charges to the high voltage provided by the start up transient. Now pin 1 of comparator 54 is attached to the output of the voltage divider between R17, R18.

During the start up transient, because of the scaling by resistor R17, R18, pin 2 is at a higher potential than pin 1, and therefore the output pin 3 is positive. However, charging of capacitor C6 is blocked by diode D14.

After the transient dies away, the voltage at pin 2 immediately follows to a low value. However, the voltage of pin 1 is held high by the slow discharge of capacitor C2. Because pin 1 is now "high" and pin 2 is "low", the output pin 3 is "low", the output pin 3 is "low" and one pulse passes capacitor C5 charging C6 by one pulse. However, one pulse time of charging of C6 is not sufficient to raise the potential of capacitor C6 for comparator 56 to change state. Thus, a start transient does not generate a false interrupt signal.

If capacitor C5 were a resistor, this DC voltage condition of output pin 3 of amplifier 54 would cause C6 to charge, and thereby the generation of a false phase loss output signal from output pin 3 of operational amplifier 58 of trip/set comparator 33. The fact that capacitor C5 is a capacitor and not a resistor blocks the DC voltage condition of output pin 3 of amplifier 54 from charging capacitor C6 to a sufficiently high voltage to initiate a tripping signal, thereby preventing the generation of a false phase loss signal.

SUMMARY

To summarize the description given above, a true phase loss signal produces a train of pulses at output pin 3 of amplifier 54. The foregoing is the result of the voltage on pin 2 of amplifier 54 going below the voltage at pin 1 of amplifier 54 twice each cycle as indicated in FIG. 7. Thus, twice each cycle the voltage at pin 3 of amplifier 54 dips below the voltage at pin 2 of amplifier 54, thereby generating a negative going output pulse at output pin 3 of amplifier 54. These negative going output pulses at pin 3 of amplifier 54 charge capacitor C6. Thus in a true phase loss condition, capacitor C6 charges to a preselected voltage, as set by the trip/set comparator 33 then relays CR1 and CR2 are energized, thereby cutting off the motor M.

In a non-phase loss condition, capacitor C5 blocks all but a single DC transition of amplifier 54 from significantly charging capacitor C6. More specifically, in the event of a DC transition from pin 3 of amplifier 54 due to starting transients, stopping and severe load transients, only one charging pulse reaches capacitor C6. In a non-phase loss condition, one pulse is not enough to charge capacitor C6 to a sufficiently high voltage to enable amplifier 58 of trip/reset comparator 33 to provide an output at its pin 3.

Capacitor C6 has a capacitance of 6.8 microfarad, thereby allowing a trip time of less than 1 second. A trip time of less than 1 second is selected since it permits a fast response of the phase loss circuit relative to a loss of current flow in a phase, and thereby prompt de-energization of the motor M.

While the invention has been particularly shown and described with reference to a preferred embodiment thereof, it will be understood by those skilled in the art that various changes in form and details may be made therein without departing from the spirit and scope of the invention.

We claim:

1. A phase loss detection circuit for a three phase electrical system providing three phase power as to a motor, the three phase electrical system being subject to a phase loss condition and a transient condition, said transient condition including starting transients, stopping transients or severe load transients, said phase loss detection circuit for distinguishing between a phase loss condition and said transient condition and indicating when said loss of phase has occurred comprising:
    means for detecting an instantaneous voltage of said electrical system;
    means for generating an instantaneous voltage signal representing said instantaneous detected voltage;
    means for detecting a peak detected voltage of said electrical system;
    means for generating a peak detected voltage signal representing said peak detected voltage;
    means for comparing said peak detected voltage with said instantaneous voltage and generating a compared signal, said compared signal comprising a first polarity during steady state operation, a second, opposite polarity during said transient condition and an alternating polarity during said phase loss condition; and
    means for detecting said alternating polarity compared signal, thereby indicating said phase loss condition.

2. The phase loss detection circuit of claim 1 wherein said means for detecting said alternating polarity compared signal comprises a diode for blocking said compared signal when said compared signal is the first polarity and a high pass filter for blocking said compared signal when said compared signal is the second, opposite polarity.

3. The phase loss detection circuit of claim 1 wherein said means for detecting said alternating polarity comprises:
    a trip comparator;
    a charging capacitor;
    a pulse width capacitor; and
    first, second and third diodes;
    wherein said first diode, said pulse width capacitor and said second diode are joined in series between said output of said comparing means and an input of said trip comparator, said first and second diodes are reverse biased with respect to said comparing means, said third diode is coupled between ground and the junction of the pulse width capacitor and said second diode, and the charging capacitor is coupled between ground and the junction of the second diode and the trip reset.

4. An improvement to a phase loss detection circuit for detecting a phase loss condition on a three phase electrical system providing three phase power as to a motor, the three phase system subject to a phase loss condition and a transient condition, said transient condition including starting transients, stopping transients or severe load transients, said phase loss detection circuit comprising
    means for detecting an instantaneous voltage of said electrical system,
    means for generating an instantaneous voltage signal representing said instantaneous detected voltage,
    means for detecting a peak detected voltage of said electrical system,
    means for generating a peak detected voltage signal representing said peak detected voltage,
    means for comparing said peak detected voltage with said instantaneous voltage and generating a compared signal, said compared signal comprising a signal of a first polarity during a steady state condition and a signal of a second, opposite polarity during the presence of either said phase loss condition or said transient condition, and
    means for detecting said second opposite polarity, thereby indicating a possibility of said phase loss condition, the improvement comprising:
    means for determining whether said second polarity signal represents a phase loss condition or a transient condition.

5. The improvement of claim 4 wherein said second polarity signal remains at a relatively constant value during a transient condition and is pulsed during a phase loss condition, and said determining means comprises a highpass filter for passing only the pulsed second signal.

6. An improvement to a phase loss detection circuit for detecting a phase loss condition on a three phase electrical system for providing three phase power as to a motor, the three phase electrical system subject to a phase loss condition and a transient condition, said transient condition including starting transients, stopping transients or severe load transients, said phase loss detection circuit comprising:

means for detecting an instantaneous voltage of said electrical system, means for generating an instantaneous voltage signal representing said instantaneous detected voltage, means for detecting a peak detected voltage of said electrical system, means for generating a peak detected voltage signal representing said peak detected voltage, means for comparing said peak detected voltage with said instantaneous voltage and generating a compared signal, said compared signal comprising a signal of a first polarity during a steady state condition, a signal of a relatively constant second, opposite polarity during said transient condition, and a signal of a pulsed second, opposite polarity during said phase loss condition, a diode coupled at one end to an output of said comparing means and biased to block said first polarity signal, a charging capacitor coupled between the other end of the diode and ground, said charging capacitor being charged by said second polarity signal, and means for detecting when said capacitor has charged to a predetermined level, thereby indicating either a phase loss condition or a transient condition, the improvement comprising:

means for determining whether said second polarity signal represents said phase loss condition or said transient condition.

7. The improvement of claim 6 wherein said detecting means comprises a high pass filter disposed between said diode and said detecting means for blocking passage of said relatively constant second polarity signal.

* * * * *